(12) United States Patent
Toyoshima et al.

(10) Patent No.: US 7,395,130 B2
(45) Date of Patent: Jul. 1, 2008

(54) METHOD AND SYSTEM FOR AGGREGATING AND COMBINING MANUFACTURING DATA FOR ANALYSIS

(75) Inventors: Naoki Toyoshima, Miki (JP); Yuko Maeda, Takarazuka (JP)

(73) Assignee: Micron Technology, Inc., Boise, ID (US)

(*) Notice: Subject to any disclaimer, the term of this patent is extended or adjusted under 35 U.S.C. 154(b) by 232 days.

(21) Appl. No.: 10/789,895

(22) Filed: Feb. 27, 2004

(65) Prior Publication Data

US 2005/0192694 A1    Sep. 1, 2005

(51) Int. Cl.
*G06F 19/00* (2006.01)
(52) U.S. Cl. .................................... 700/108; 700/121
(58) Field of Classification Search ............... 700/90, 700/95, 108–110, 121
See application file for complete search history.

(56) References Cited

U.S. PATENT DOCUMENTS

| | | | |
|---|---|---|---|
| 4,719,694 A * | 1/1988 | Herberich et al. ............. 29/703 |
| 4,825,093 A | 4/1989 | Kiriseko et al. |
| 5,240,866 A | 8/1993 | Friedman et al. |
| 5,294,812 A | 3/1994 | Hashimoto et al. |
| 5,313,156 A * | 5/1994 | Klug et al. ............... 324/158.1 |
| 5,347,463 A * | 9/1994 | Nakamura et al. .......... 700/226 |
| 5,555,504 A | 9/1996 | Lepper et al. |
| 5,567,927 A | 10/1996 | Kahn et al. |
| 5,642,307 A | 6/1997 | Jernigan |
| 5,726,920 A | 3/1998 | Chen et al. |
| 5,768,144 A | 6/1998 | Nagase |
| 5,805,472 A | 9/1998 | Fukasawa |
| 5,886,896 A | 3/1999 | Lantz et al. |
| 5,894,266 A | 4/1999 | Wood, Jr. et al. |
| 5,915,231 A | 6/1999 | Beffa |
| 5,927,512 A | 7/1999 | Beffa |
| 5,963,881 A | 10/1999 | Kahn et al. |
| 6,256,593 B1 | 7/2001 | Damon et al. |
| 6,320,201 B1 | 11/2001 | Corbett et al. |
| 6,351,684 B1 * | 2/2002 | Shirley et al. ............... 700/121 |
| 6,373,976 B1 | 4/2002 | Pierrat et al. |
| 6,427,092 B1 | 7/2002 | Jones et al. |
| 6,433,871 B1 | 8/2002 | Lensing et al. |
| 6,446,017 B1 | 9/2002 | Skidmore |
| 6,465,141 B2 | 10/2002 | Boettiger et al. |
| 6,526,547 B2 | 2/2003 | Breiner et al. |
| 6,534,785 B1 | 3/2003 | Farnworth et al. |
| 6,546,304 B2 * | 4/2003 | Thorvaldsson et al. ...... 700/115 |
| 6,560,506 B2 | 5/2003 | Toprac |

(Continued)

*Primary Examiner*—Zoila E Cabrera
(74) *Attorney, Agent, or Firm*—Schwegman, Lundberg & Woessner, P.A.

(57) ABSTRACT

A method and system for aggregating and combining manufacturing data for analysis for the purposes of increasing manufacturing efficiency and reducing manufacturing downtime due to abnormal conditions. An embodiment provides for a method of dividing an entire manufacturing process into parts and further into subparts for the purposes of tracking the path that a workpiece takes during the entire manufacturing process. Data is measured specific to the path and assigned to a data set stored on a data processing device for analysis of the conditions for the workpiece being examined. An embodiment provides for quicker data analysis which may result in less manufacturing product being discarded due to lengthy delays between abnormal conditions and the response to those conditions. An embodiment provides for users to be alerted when abnormal conditions are present. In one example, a data processing device non-manually halts production when abnormal conditions are present.

64 Claims, 8 Drawing Sheets

U.S. PATENT DOCUMENTS

| | | |
|---|---|---|
| 6,577,914 B1 | 6/2003 | Bode |
| 6,580,961 B2 | 6/2003 | Diggin et al. |
| 6,588,854 B2 * | 7/2003 | Wilson et al. ............... 702/145 |
| 6,594,013 B2 | 7/2003 | Thakur et al. |
| 6,605,159 B2 | 8/2003 | Joslyn |
| 6,622,102 B2 | 9/2003 | Skidmore |
| 6,628,410 B2 | 9/2003 | Doan |
| 6,650,955 B1 | 11/2003 | Sonderman et al. |
| 6,661,515 B2 | 12/2003 | Worster et al. |
| 6,671,569 B1 * | 12/2003 | Schoop et al. .............. 700/112 |
| 6,751,518 B1 | 6/2004 | Sonderman et al. |
| 6,775,630 B2 | 8/2004 | Behkami et al. |
| 6,859,756 B2 | 2/2005 | Allen |
| 7,006,948 B2 | 2/2006 | Allen |
| 2002/0188417 A1 * | 12/2002 | Levy et al. .................. 702/155 |
| 2003/0102367 A1 * | 6/2003 | Monette et al. ............. 235/376 |
| 2004/0029299 A1 | 2/2004 | Pasadyn et al. |
| 2004/0138773 A1 | 7/2004 | Tomoyasu |
| 2005/0165731 A1 | 7/2005 | Funk |
| 2006/0250906 A1 | 11/2006 | Toyoshima et al. |
| 2006/0259177 A1 | 11/2006 | Toyoshima et al. |

* cited by examiner

METHOD AND SYSTEM FOR AGGREGATING AND COMBINING MANUFACTURING DATA FOR ANALYSIS

CROSS REFERENCE TO RELATED APPLICATIONS

This patent application is related to U.S. patent application Ser. No. 10/786,678 entitled METHOD AND SYSTEM FOR CORRELATING AND COMBINING PRODUCTION AND NON-PRODUCTION DATA FOR ANALYSIS, to Naoki Toyoshima, Shinichi Murakami and Yuko Maeda, assigned to Micron Technology, Inc., and incorporated herein by reference.

TECHNICAL FIELD

The present invention generally relates to integrated circuit manufacturing. The present invention also generally relates to methods for reducing integrated circuit manufacturing abnormalities. The present invention also generally relates to a method to aggregate and combine data from integrated circuit manufacturing processes for data analysis.

BACKGROUND

Defects in semiconductor manufacturing processes result in lost production and fabrication downtime. The cause of these defective products is hard to determine as today's manufacturing processes involve not only a single manufacturing operation but multiple instances of the same operation performed by different machines and a multitude of other processes and machines. Identifying the cause of the error is in itself time-consuming and the large amounts of data to examine makes quick and accurate analysis difficult.

During the semiconductor manufacturing process the unprocessed wafer proceeds through several distinct manufacturing processes. Measurements are taken during this process and analyzed. If the analysis shows that a problem is occurring the process is stopped and the condition resolved before production is allowed to resume. These processes can become very complicated and data analysis may not be able to be completed and studied until well after the time that the particular wafer that had been processed has been completely processed by the faulty process.

Further compounding the lag time between the measurement and the analysis and then the subsequent reaction is that for a single process, a number of machines may perform that same exact process. The number of measurements taken during this manufacturing process expands linearly and data analysis is no longer cumbersome, it is impossible. Anomalies in the processes are not identified quickly enough and entire lots of end-product may be defective as a result.

The problem is that there is no easy way to combine the data and reduce the data processing time so meaningful data analysis can take place and reaction to current conditions can take place quicker. What is needed is a way to aggregate processes and resulting data for the purposes of analysis.

SUMMARY OF THE INVENTION

An embodiment of the present invention relates to a method of utilizing computer aided data analysis to detect manufacturing process abnormalities. Embodiments of the present invention aggregate data. Examples of the data include online and offline data, which are collected from a variety of sources. This method makes it possible to collect data powerfully within a few hours, allowing enough time for an engineer to make decisions as to process control. For instance, they can make a precise decision to stop or continue a particular manufacturing process based on the analyzed data if that analysis indicates that the process is having a problem.

An embodiment of the present invention is a method for detecting conditions in an electronic device manufacturing process. In an embodiment the electronic devices are integrated circuits. The method includes grouping a first, second, third and further groups of processes that are related in some manner. An embodiment further identifies the routes that a production lot of workpieces may take through the possible groups. An embodiment further assigns that route's measured data items to the data set of the production. An embodiment further adds manufacturing performance data specific to that route to the data related to that production lot. An embodiment further performs an analysis on that data.

In an embodiment the analysis is examined for the occurrence of out of specification readings or trends. The occurrence of such readings or trends results in the possible notification of the users or engineers responsible for the proper functioning of the process.

In an embodiment the method for detecting and responding to conditions in an electronic device manufacturing process is performed by a computer system which includes at least some of: a processor, output device, input device, bus, and a storage device which contains instructions to carry out the method taught by the present invention.

DETAILED DESCRIPTION OF THE INVENTION

Figure 1:
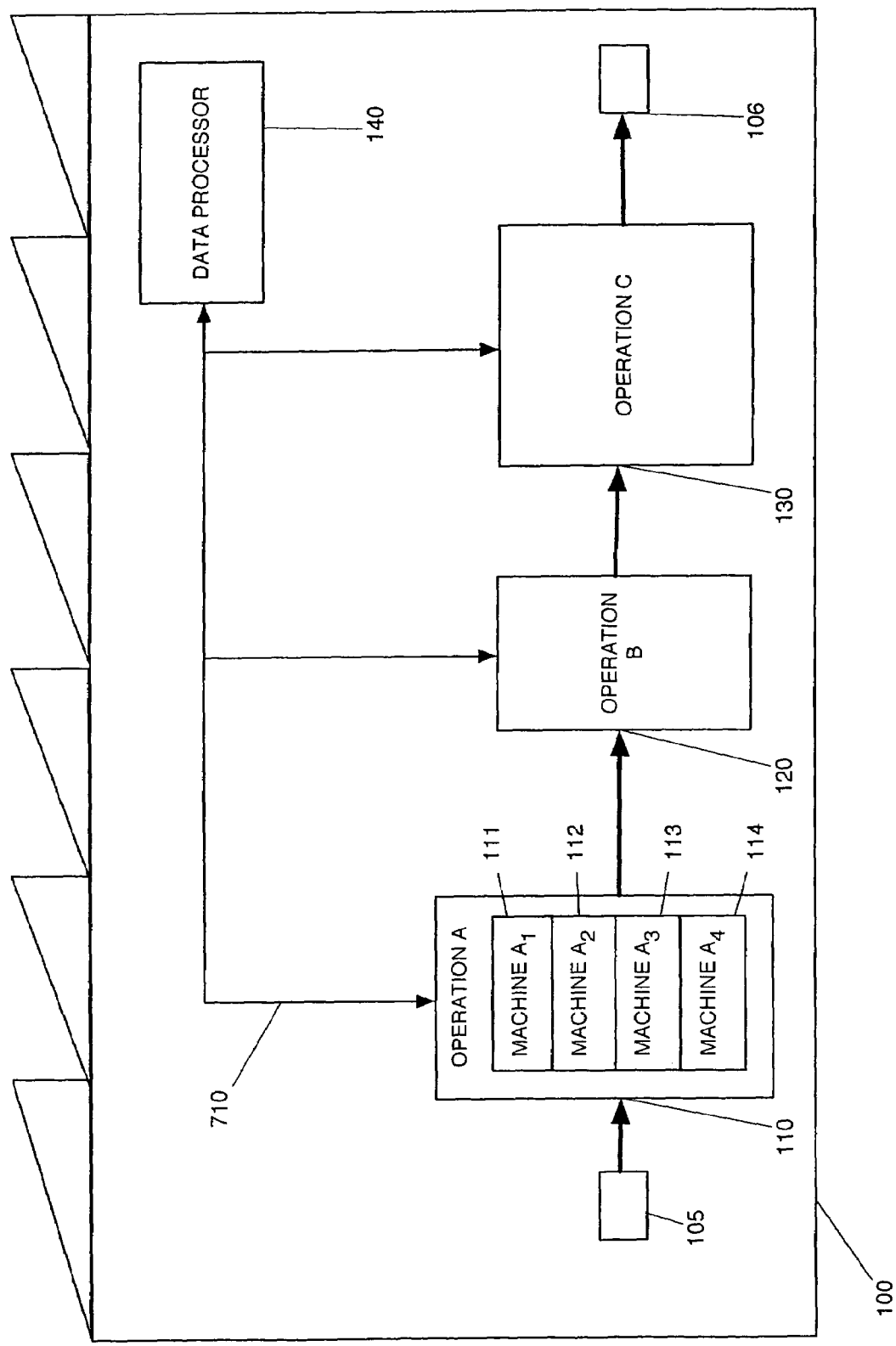
FIG. 1 is a pictorial representation of an exemplary fabrication facility with fabricating processes contained therein.

In the following detailed description of exemplary embodiments of the invention, reference is made to the accompanying drawings (where like numbers designate like elements), which form a part hereof, and in which is shown by way of illustration specific exemplary embodiments in which the invention may be practices. Those embodiments are described in sufficient detail to enable those skilled in the art to practice the invention, and it is to be understood that other embodiments may be utilized and logical, mechanical, electrical and other changes may be made without departing from the scope of the present invention. In the description, numerous specific details are set forth to provide a thorough understanding of the invention. However, it is understood that the invention may be practiced without those specific details. In other instances, well-known circuits, structures and techniques have not been shown in detail in order not to obscure the invention.

Parts of the description may be presented in terms of operations performed through the execution of programming instructions. As well understood by those skilled in the art, those operations may take the form of electrical, magnetic, or optical signals capable of being stored, transferred, combined, and otherwise manipulated through, for example, electrical components.

The term substrate is understood to include semiconductor wafers. The term substrate is also used to refer to semiconductor structures during processing, and may include other layers that have been fabricated thereupon. Both wafer and substrate include doped and undoped semiconductors, epitaxial semiconductor layers supported by a base semiconductor or insulator, as well as other semiconductor structures well known to one skilled in the art. The term conductor is understood to include semiconductors, and the term insulator or dielectric is defined to include any material that is less electrically conductive than the materials referred to as conductors. In embodiments of the present invention, the term workpiece includes substrate or wafer or integrated circuits or other electronic devices.

The term lot is understood to include a subset of the entirety of fabricated workpieces. A lot may further be considered as that quantity of product produced under similar conditions, at a similar establishment, over some period of time.

The terms operation, machine, process, and chamber are used in the present application to describe various abstractions of the fabrication process. In an embodiment, an operation is a top level abstraction and may include subdivisions, such as, machines, processes, chambers, etc. It is to be understood that an operation may also be subdivided into further operations, according to an embodiment of the present operation for other abstracted analysis of data. In a further embodiment of the present invention, top-level operations may be further aggregated, up and including, considering an entire manufacturing facility as a single operation. In an embodiment, a machine is a mid-level abstraction and may include subdivisions, such as, processes, chambers, etc. In an embodiment, the term machine is not to be taken in a limiting sense as a single physical machine, but in a more broader sense as a collection of processes, chambers, other machines, etc. In an embodiment, a machine may denote the aggregation of multiple machines, including the subdivisions, if any, of such machines. In an embodiment, a process is a low-level abstraction and may include subdivisions, such as, chambers. In an embodiment, a process is a mid-level abstraction and may include subdivisions, such as, machines, chambers, etc. In an embodiment, a process may denote the aggregation of multiple processes, including the subdivisions, if any, of such processes. In an embodiment, a chamber is a low-level abstraction and typically will not include further subdivisions. In an embodiment, a chamber may denote the aggregation of multiple chambers and may include further subdivisions. Though the terms operation, machine, process and chamber are used to represent a hierarchical linking between manufacturing steps, this is not limiting. It is to be understood that an operation may be a single machine, an aggregation of machines, a single process, an aggregation of processes, a single chamber, an aggregation of chambers, or any combination. Further, any of the other steps, such as a process, may be performed by any combination of the other steps. For example, an operation may include wafer handling unit chambers which perform a process on a wafer. It will be understood by those skilled in the art, that any subdivision of manufacturing steps can be used by embodiments of the present invention, and that mere use of other terms to denote manufacturing steps does not depart from the scope of the present invention.

FIG. 1 depicts a pictorial representation of a simplified manufacturing process for workpieces. Workpieces, in an embodiment, include integrated circuits. Workpieces for processing 105 enter the manufacturing process and are processed, in this simple example, by three separate operations 110, 120, and 130. It is recognized that though the term operation is used, the term operation may include any number of machines, chambers, processes, etc. Further, the operation may include a single machine, chamber, process, etc. Conditions in the operations performing the processing are very important to the end quality of the finished product 106. In addition, the conditions of the manufacturing facility 100 may also impact the quality of the end product 106. In an embodiment, a manufacturing facility includes an integrated circuit fabrication building, wafer handling unit, vertical furnace machines, computer component assembly facilities, etc. It is recognized that each of these manufacturing operations may further be subdivided. These subdivisions represent the technique of using multiple machines, chambers, processes, etc. to perform the same operation. In 110, this is exemplified by the four individual machines, Machine $A_1$ 111, Machine $A_2$ 112, Machine $A_3$ 113, and Machine $A_4$ 114. Each of these machines performs a substantially similar operation to respective workpiece being processed in the respective machine. However, data relating to one machine 111, 112, 113 or 114 is not relevant to the other machines. For example, data in regards to Machine $A_3$ 113 for example, would be of no relevance to a workpiece that was processed by Machine $A_1$ 111. Capturing data for Machine $A_3$ 113 and including that data in an analysis of conditions for workpieces processed by Machine $A_1$ 111 carried out by a data processor 140 would represent a computational cost that prohibits the real time analysis of data relating to machine $A_3$ 113 and further prohibits accurate, real time analysis of the entire operation 110. This results in workpiece lots progressing further down the operational chain and when the data finally yields results that an operator or system can react to, resources have been wasted on the lots in further processing. In an extreme case, this may lead to scrapping entire lots of workpieces. Though the operation at 110 is subdivided into machines, it is recognized that there are other subdivisions possible, including subdividing an operation into other operations, chambers, machines, processes, etc.

Data may also be measured on the operations at 120 and 130. These operations may further be subdivided. In an embodiment, this subdivision is similar to the subdivision presented in Operation A 110, as described above. In an embodiment, this subdivision is performed by some other logical arrangement, such as, consecutive non-similar machines being subdivided by the possible route that a workpiece may take through the operation. In such an arrangement, data is acquired for workpieces depending on the route the workpieces took, and stored in a data set relevant to the workpiece being examined, for further analysis by a data processor 140. Data concerning Operation C 130 is acquired for workpieces being processed according to the operation subdivisions contemplated for Operation C 130. Data acquisition for a particular production lot of workpieces is only performed from sources that relate to the processing that the particular lot of workpieces underwent. This reduces the amount of extraneous data being collected and stored and allows for quicker data analysis. This has the added benefit of providing for quicker response to conditions present in the fabrication operations.

Measurements may be taken on the workpiece 105 as well as conditions of the actual manufacturing operations 110, 120, 130. These measurements can be called production data. The production data is from sources that are directly related to the manufacturing process being performed. These sources include, but are not limited to, test probe data, parametric data, film thickness data, and critical dimension data. In an embodiment, a particular production data sample is gathered once per lot, i.e., production lot data. In an embodiment, a particular production data sample is gathered multiple times per lot. In an embodiment, a particular data sample is applied across multiple production lots. Though this detailed description uses the term production data to refer to these data measurements, this is not to be taken in a limiting sense, as any data that relates directly to the manufacturing process being performed is considered to be production data, regardless of what it is actually called. Further, production data may be further defined as being either online or offline. Online data may be data which is measured directly on the workpiece being manufactured and may be things such as the temperature of the manufactured workpiece, or its thickness. Online data may also be data measured from the manufacturing process in question while the workpiece is being processed. Offline data is that data that, though directly related to the manufacturing process, is not measured on the actual manufactured workpiece or during the actual manufacturing step, such as the operating temperature of the machine, the operating pressure, critical dimensions data on a finished workpiece, or some other measurement.

The pictorial element labeled 100 represents the entire facility in which the manufacturing process resides. Measurements may be conducted on the entire facility, as well. These measurements can be called non-production data or alternatively, facility data. The non-production data is from sources not directly related to the manufacturing process. These sources include, but are not limited to, atmospheric conditions, water conditions, gas conditions, chemical conditions, exhaust pressure, and electrical conditions. In an embodiment, a particular sample is gathered from one location by one sensor. In an embodiment, a particular sample is gathered from multiple locations by multiple sensors. Alternatively, these measurements may be called facility data as they generally, but without limitation, relate to the facility in which the production takes place. Though this detailed description uses the term non-production data, or facility data, to refer to these data measurements, this is not to be taken in a limiting sense, as any data that does not relate directly to the workpiece can be considered to be non-production data, or facility data, regardless of what it is actually called. This data is input into a data processor 140 for further analysis.

Figure 2:
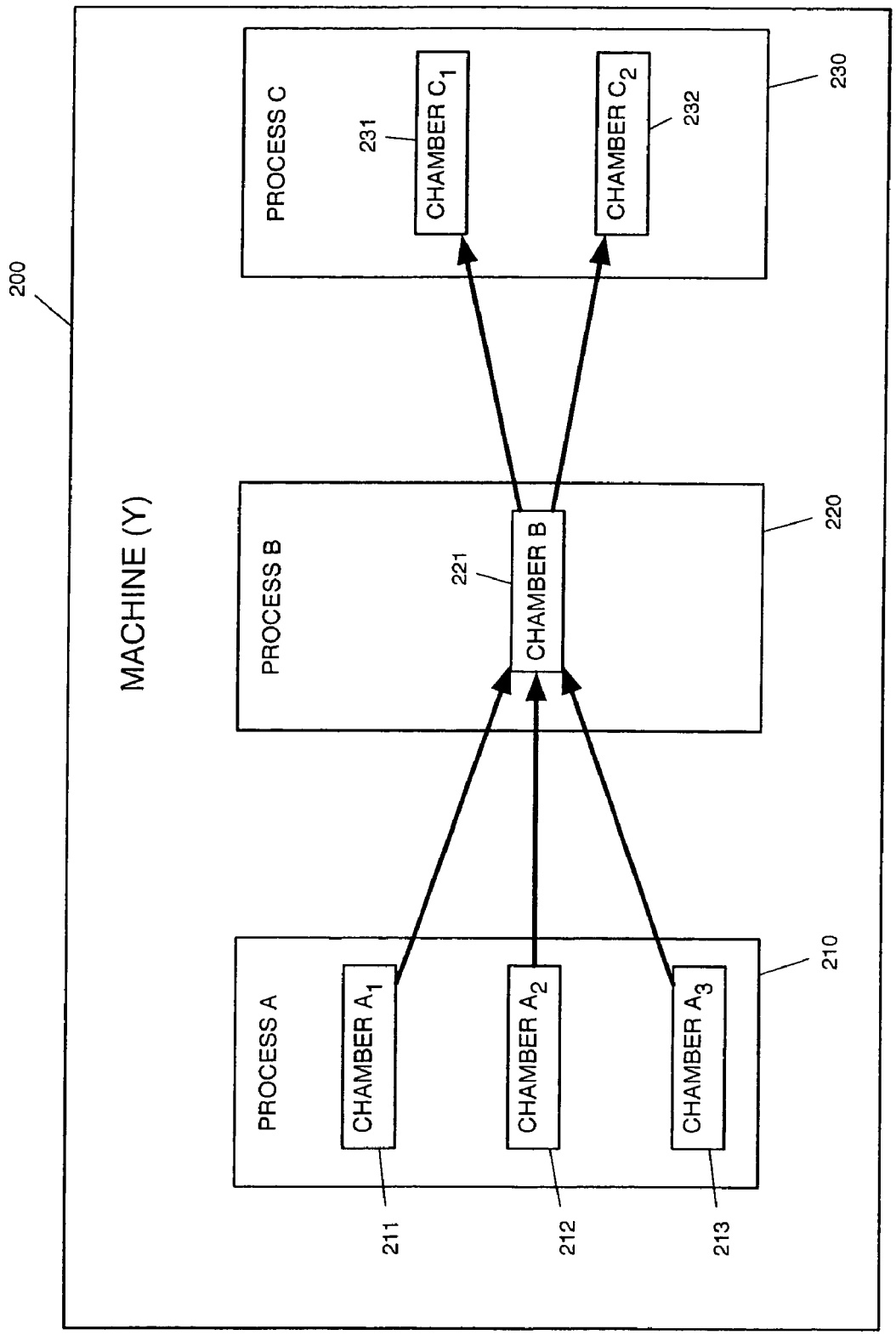
FIG. 2 is a pictorial representation of a scenario of an embodiment of the present invention.

FIG. 2 is a pictorial representation of an exemplary combination of multiple chambers in a single fabrication machine 200 according to an embodiment of the present invention. A workpiece for processing proceeds left to right in this example, being first processed by Process A 210, then Process B 220, and finally Process C, 230. Each of the constituent process may have multiple chambers for performing the similar process. In this example, Process A 210 is accomplished by one of three chambers, Chamber $A_1$ 211, Chamber $A_2$ 212 or Chamber $A_3$ 213. In this example, Process B 220 is accomplished by one chamber, Chamber B 221. In this example, Process C 230 is accomplished by one of two chambers, Chamber $C_1$ 231 or Chamber $C_2$ 232. The number of possible routes, or groups, through Machine Y 200 can be given by the equation:

$$G_n = N_a * N_b * N_c$$

where, $G_n$ is the number of possible routes, or groups, through Machine Y 200, $N_a$ is the number of chambers performing Process A 210, $N_b$ is the number of chambers performing Process B 220, and $N_c$ is the number of chambers performing Process C 230. In the example given by FIG. 2, the number of possible routes, or groups, is 6. These groups are as follows:

Group $Y_1$: $A_1$-B-$C_1$

Group $Y_2$: $A_1$-B-$C_2$

Group $Y_3$: $A_2$-B-$C_1$

Group $Y_4$: $A_2$-B-$C_2$

Group $Y_5$: $A_3$-B-$C_1$

Group $Y_6$: $A_3$-B-$C_2$

In an embodiment, Process B 220 has two chambers performing the same process. The number of possible routes, or groups, through Machine Y 200 can be given by the equation:

$$G_n = N_a * N_b * N_c$$

where, $G_n$ is the number of possible routes, or groups, through Machine Y 200, $N_a$ is the number of chambers performing Process A 210, $N_b$ is the number of chambers performing Process B 220, in this case 2, and $N_c$ is the number of chambers performing Process C 230. In this embodiment the number of possible routes, or groups, through Machine Y 200 is 12.

Providing for the general case, a multi-chambered machine, Machine Z, has several chambers doing a specific process (process-1, process-2, ..., process-n). Some of those chambers accomplish the same process. Consider the machine, Machine Z, that does m different processes in a lot of different possible routes:

Process-1: Machine Z has $Z_1$ chambers

Process-2: Machine Z has $Z_2$ chambers

⋮

Process-m: Machine Z has $Z_n$ chambers

Thus, the number of possible combinations, or groups, for the whole process pattern is $(Z_1 * Z_2 * \ldots * Z_n)$ in this machine.

Figure 3:
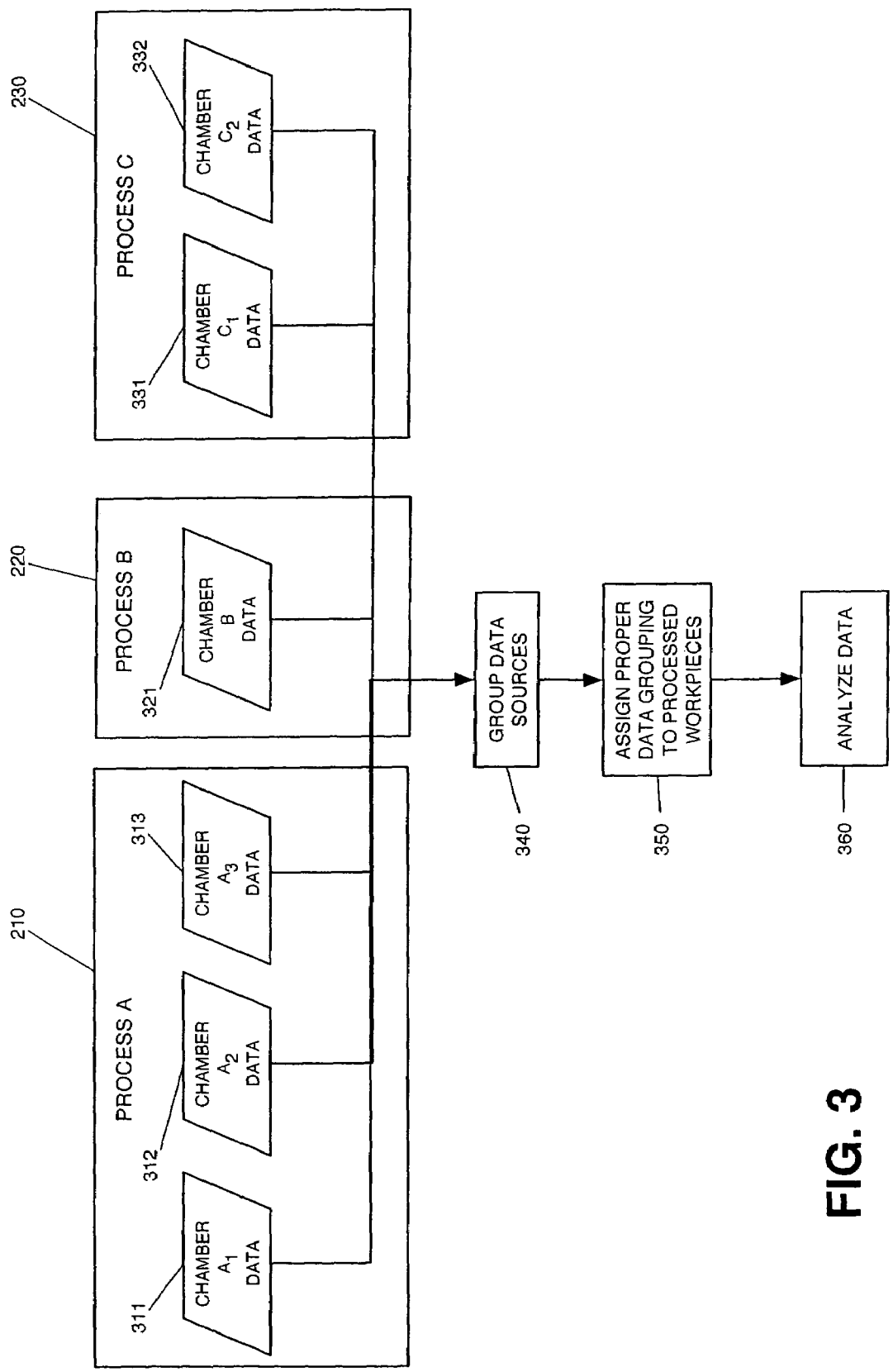
FIG. 3 is a flowchart illustrating generally a method according to an embodiment of the present invention.

FIG. 3 presents, at a high level, a flowchart of the method, according to an embodiment of the present invention for the handling of data from a machine, e.g., Machine Y 200 as depicted in FIG. 2. Process A 210, has three data sources, data from Chamber $A_1$ 311, data from Chamber $A_2$ 312, and data from Chamber $A_3$ 313. Process B 220, has one data source, data from Chamber B 321. Process C 230, has two data sources, data from Chamber $C_1$ 331, and data from Chamber $C_2$ 332. These data sources include, but are not limited to, test probe data, parametric data, film thickness data, critical dimension data, DC tester data, inline measurement tool data, surface characteristics data, etc. Moreover, data related to any chamber is measured after a chamber in the operation. In an embodiment, data is measured relative to a chamber after a workpiece leaves the chamber and prior to subsequent process. Data from Chambers $A_1$-$A_3$, Chamber B, and Chambers $C_1$-$C_2$ are grouped at 340 according to the possible routes a workpiece may take through the entire machine, Machine Y 200. According to which one of these routes a particular lot of workpieces undertook, the proper data grouping is assigned to that lot at 350. Based on the proper data grouping, specific measured data can be assigned to the data set corresponding to the particular lot of workpieces being examined. In an embodiment this measured data can include, but not be limited to, test probe data, parametric data, film thickness data, critical dimension data, DC tester data, inline measurement tool data, surface characteristics data, etc. Following proper grouping of the data and assigning that data grouping to the lot of workpieces at 350, the data is analyzed 360. In an embodiment, the analysis 360 is a statistical analysis of the data. In an embodiment, the analysis 360 is a trend analysis. In an embodiment, this analysis 360 can be compared to expected conditions. Any current manufacturing conditions that depart from the expected conditions can trigger a warning. In an embodiment, the warning can be an audible warning. In an embodiment, the warning can be a message sent to communications devices. In an embodiment, the warning can be a message sent over a Wide Area Network to a user or computer system. In an embodiment, a departure from expected conditions can trigger a non-manual shut down of all fabrication machines in the groups being currently examined. It is to be recognized that only with quicker, accurate and more focused data analysis 360 can timely and appropriate reactions to current conditions be made.

Figure 4:
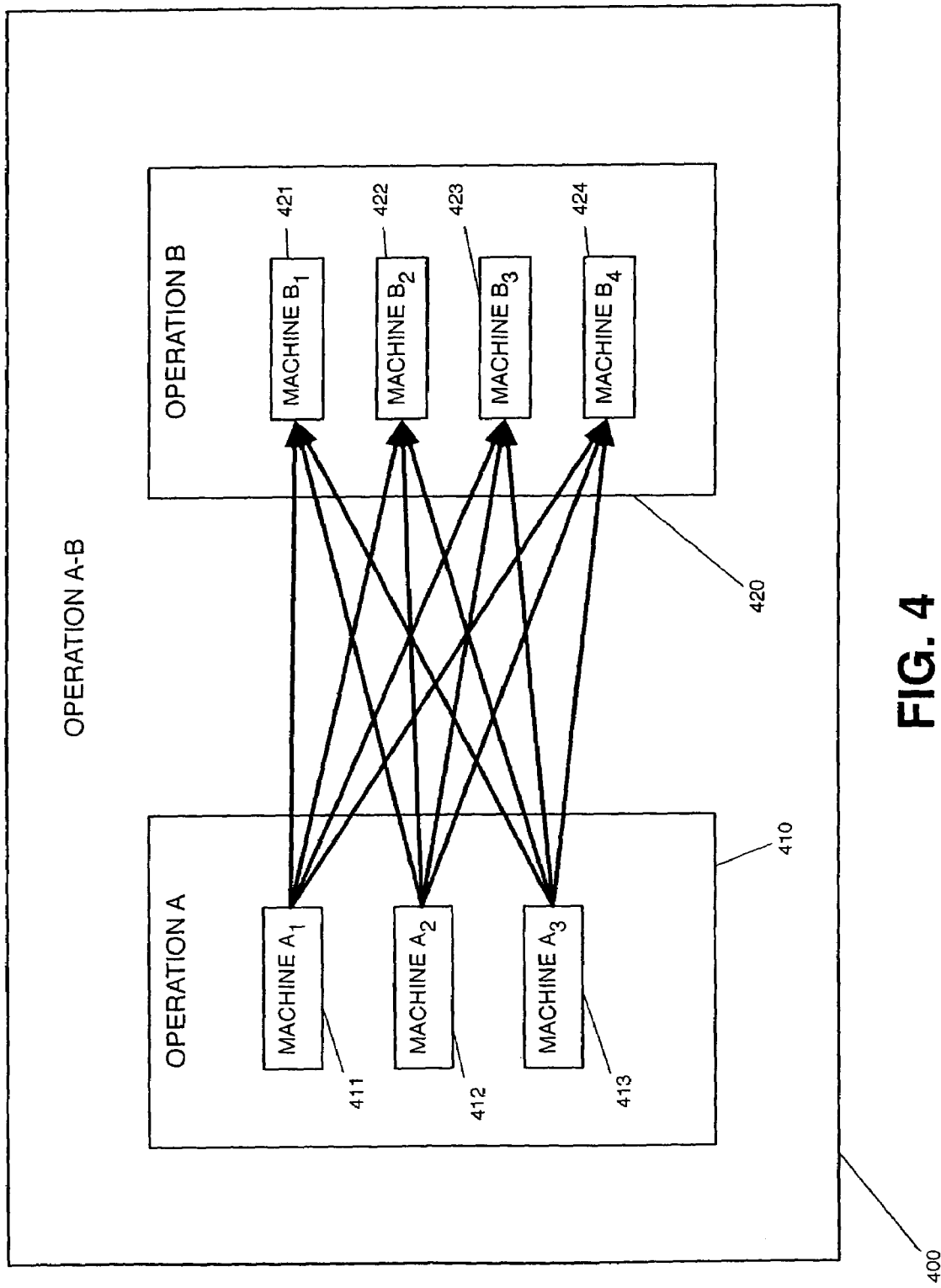
FIG. 4 is a pictorial representation of a scenario of an embodiment of the present invention.

FIG. 4 is a pictorial representation of a two step process according to an embodiment of the present invention. In this example, a workpiece undergoes processing by Operation A 410 and then undergoes processing by Operation B 420. Operation A 410 can be performed by three different machines, Machine $A_1$ 411, Machine $A_2$ 412, or Machine $A_3$ 413. Operation B 420 can be performed by four different machines, Machine $B_1$ 421, Machine $B_2$ 422, Machine $B_3$ 423, or Machine $B_4$ 424. In an embodiment of the present invention a combination of these operations can be treated as a single operation such that, instead of analyzing Operation A 410, then Operation B 420, Operation A-B 400 can be analyzed singly. In order to treat a plurality of operations as a single operation or machine, the route of the workpiece undergoing processing must be provided. Specifically, the multiple routes are each assigned a group. As described herein, the number of groups in this example is 12, given by the equation:

$$G = N_a * N_b$$

where, $G_n$ is the number of possible routes, or groups, through Operation A-B 400, $N_a$ is the number of machines performing Operation A 410, and $N_b$ is the number of machines performing Operation B 420. In this embodiment the number of possible routes, or groups, of Operation A-B 400 is 12. Here the possible groups are:

Group 1: $A_1 - B_1$

Group 2: $A_1 - B_2$

Group 3: $A_1 - B_3$

Group 4: $A_2 - B_1$ $\vdots$

Group 12: $A_3 - B_4$

Further, in the case such as provided in FIG. 4 the number of possible routes is the mathematical product of the number of possible individual machines performing an operation and the number of possible machines performing the other operation. However, in the general case with more then two operations being performed by multiple machines, a simple mathematical product is not sufficient. Given a multiple number of operations with a number of machines performing such operation, Operation 1 ($O_1$) with $N_1$ machines, Operation 2 ($O_2$) with $N_2$ machines, Operation 3 ($O_3$) with $N_3$ machines, through to Operation t ($O_t$) with $N_t$ machines. The number of possible routes through $O_1$ and $O_2$, can be expressed as the product of $N_1$ and $N_2$. The number of the combinations of two random operations from all possible operations, t operations can be expressed as:

$$Y = {}_tC_2 = \frac{\{t*(t-1)\}}{2!}$$

where Y is the number of combinations and t is the number of operations. The number of routes is given by the sum of the routes for all the combinations, as given by the equation:

$$X = (G_{1\&2} + G_{1\&3} + \ldots + G_{1\&t}) + (G_{2\&3} + G_{2\&4} + \ldots + G_{2\&t}) + \ldots + (G_{(t-1)\&t})$$

or $$X = (N_1*N_2 + N_1*N_3 + \ldots + N_1*N_t) + (N_2*N_3 + N_2*N_4 + \ldots + N_2*N_t) + \ldots + (N_{t-1}*N_t)$$

where $G_{(t-1)\&t}$ is a representation of the number of routes of machines between operation (t−1) and operation t, $N_t$ is the number of machines performing a particular operation t and X is the number of groups for all routes.

Generally, the number of combinations of random n operations is given by:

$$Y = tC_n$$

where Y is the total number of combinations, t is the number of operations and $C_n$ is the number of individual machines performing a particular step. If the average of the number of possible routes among the operations is assumed to be G, generally, the sum of the number of possible routes in all t operations is given by:

$$Y = \sum_{n=1}^{t} tC_n * G$$

where Y is the total number of combinations, t is the number of operations, G is the number of possible routes and $C_n$ is the number of individual machines performing a particular step in the process.

Figure 5:
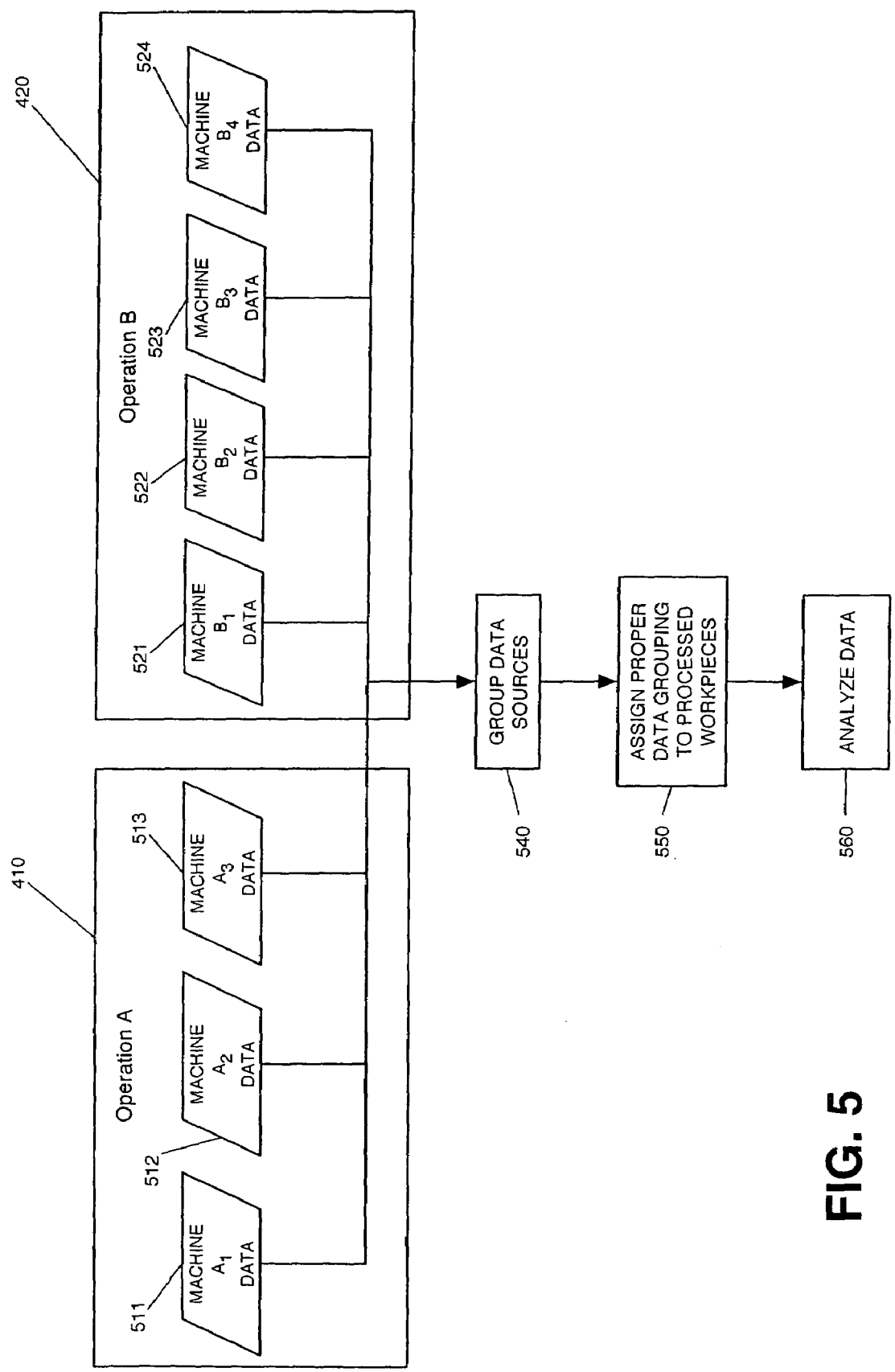
FIG. 5 is a flowchart illustrating generally a method according to an embodiment of the present invention.

FIG. 5 presents, at a high level, a flowchart of the method, according to an embodiment of the present invention for the handling of data from a combined operation, Operation A-B 400 as depicted in FIG. 4. Operation A 410, has three data sources, data from Machine $A_1$ 511, data from Machine $A_2$ 512, and data from Machine $A_3$ 513. Operation B 420 has four data sources, data from Machine $B_1$ 521, data from Machine $B_2$ 522, data from Machine $B_3$ 523, and data from Machine $B_4$ 524. These data sources include, but are not limited to, test probe data, parametric data, film thickness data, critical dimension data, DC tester data, inline measurement tool data, surface characteristics data, etc. This data is grouped at 540 according to the possible routes a workpiece may take through the combined operation. According to which one of these routes, or groups, a particular lot of workpieces undertook, a proper data grouping is assigned to that lot at 550. Based on the proper data grouping, specific measured data can be assigned to the data set corresponding to the particular lot of workpieces being examined. In an embodiment this measured data can include, but not be limited to, test probe data, parametric data, film thickness data, critical dimension data, DC tester data, inline measurement tool data, surface characteristics data, etc. Following proper grouping of the data and assigning that data grouping to the lot of workpieces at 550, the data is analyzed 560. In an embodiment, the analysis is a statistical analysis of the data. In an embodiment, the analysis 560 is a trend analysis. In an embodiment, this analysis 560 can be compared to expected conditions. Any current manufacturing conditions that depart from the expected conditions can trigger a warning. In an embodiment, the warning can be an audible warning. In an embodiment, the warning can be a message sent to communications devices. In an embodiment, the warning can be a message sent over a Wide Area Network to a user or computer system. In an embodiment, a departure from expected conditions can trigger a non-manual shut down of all fabrication machines in the groups being currently examined. It is to be recognized that only with quicker, accurate and more focused data analysis 560 can timely and appropriate reactions to current conditions be made.

In an embodiment of the present invention, the data from each sorted group can be graphed and reported automatically. In an embodiment of the present invention, specific specifications can be established for each report, including without limitation, graphs, charts, data. Further, the results and graphs can be automatically provided to the engineers responsible for the production of the workpieces being processed. With quicker data analysis by grouping or combining processes, engineers can quickly respond to conditions affecting the performance of the manufacturing process and reduce the amount of wasted material.

Figure 6:
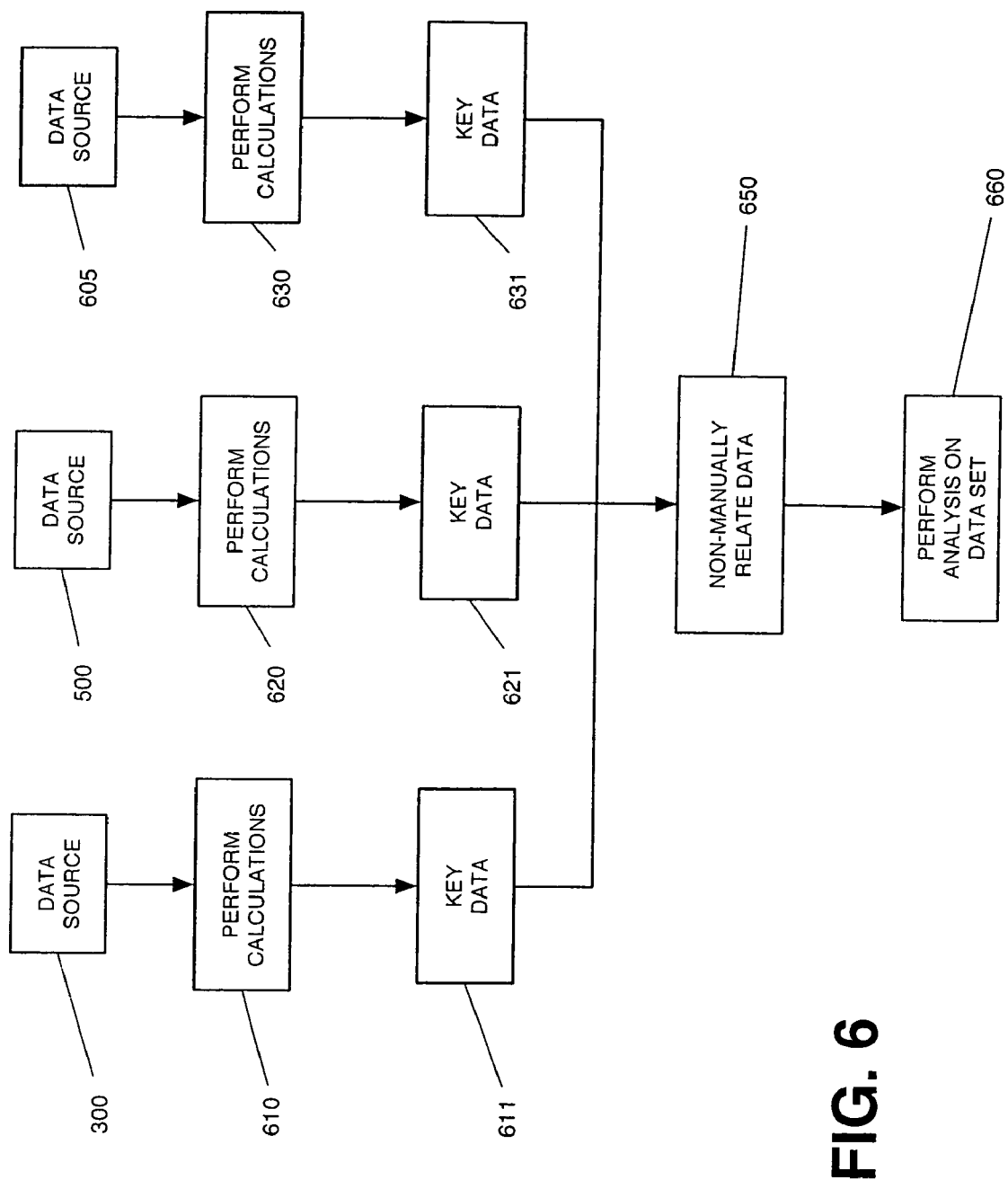
FIG. 6 is a flowchart illustrating generally a method according to an embodiment of the present invention.

FIG. 6 presents, at a high level, a flowchart of the method, according to an embodiment of the present invention for the collection and analysis of data on a particular lot of workpieces from production sources and non-production sources. The data sources 300, 500, 605, represent an exemplary set of data sources to be analyzed. It is recognized that though three data sources are represented, any number of data sources may be present. These data sources may be from production sources and from non-production sources. Data source 300 represents data from a group assigned to a particular lot of workpieces as contemplated by FIG. 2, and processed according to the method embodied in FIG. 3. Data source 500 represents data from a group assigned to a particular lot of workpieces as contemplated by FIG. 4, and processed according to the method embodied in FIG. 5. Data source 605 represents any of the other variety of data sources available in a manufacturing facility. In an embodiment of the present invention, data source 605 represents a non-production data source. These sources include, but are not limited to, atmospheric conditions, water conditions, gas conditions, chemical conditions, exhaust pressure, and electrical conditions. In an embodiment, a particular sample is gathered from one location by one sensor. In an embodiment, a particular sample is gathered from multiple locations by multiple sensors. Alternatively, these measurements may be called facility data as they generally, but without limitation, relate to the facility in which the production takes place. Though this detailed description uses the term non-production data, or facility data, to refer to these data measurements, this is not to be taken in a limiting sense, as any data that does not relate directly to the manufacturing process can be considered to be non-production data, or facility data, regardless of what it is actually called. In the case that multiple data points are collected and assigned to a particular lot of workpieces, a calculation 610 may be performed to further combine those data points into a single data point. In an embodiment, this calculation 610 may be a weighted mean calculation, weighting the data for time, location, etc. The data can then be keyed 611 to some unique value allowing for non-manual relation of the three data sources 650. Following the relation of the data at 650, the data can be quickly analyzed at 660. In an embodiment, this analysis 660 is a statistical analysis. In an embodiment, this analysis 660 is a trend analysis. In an embodiment of the present invention, this analysis 660 is very focused on the particular lot of workpieces being considered. By not including data from operations, machines, processes, chambers and the like that did not affect the lot of workpieces being considered, the data set associated with that lot of workpieces being considered can be smaller, representing a computational cost saving, and allowing for quicker data analysis 660. A quicker data analysis 660 further provides for quicker reaction to current manufacturing conditions.

Figure 7:
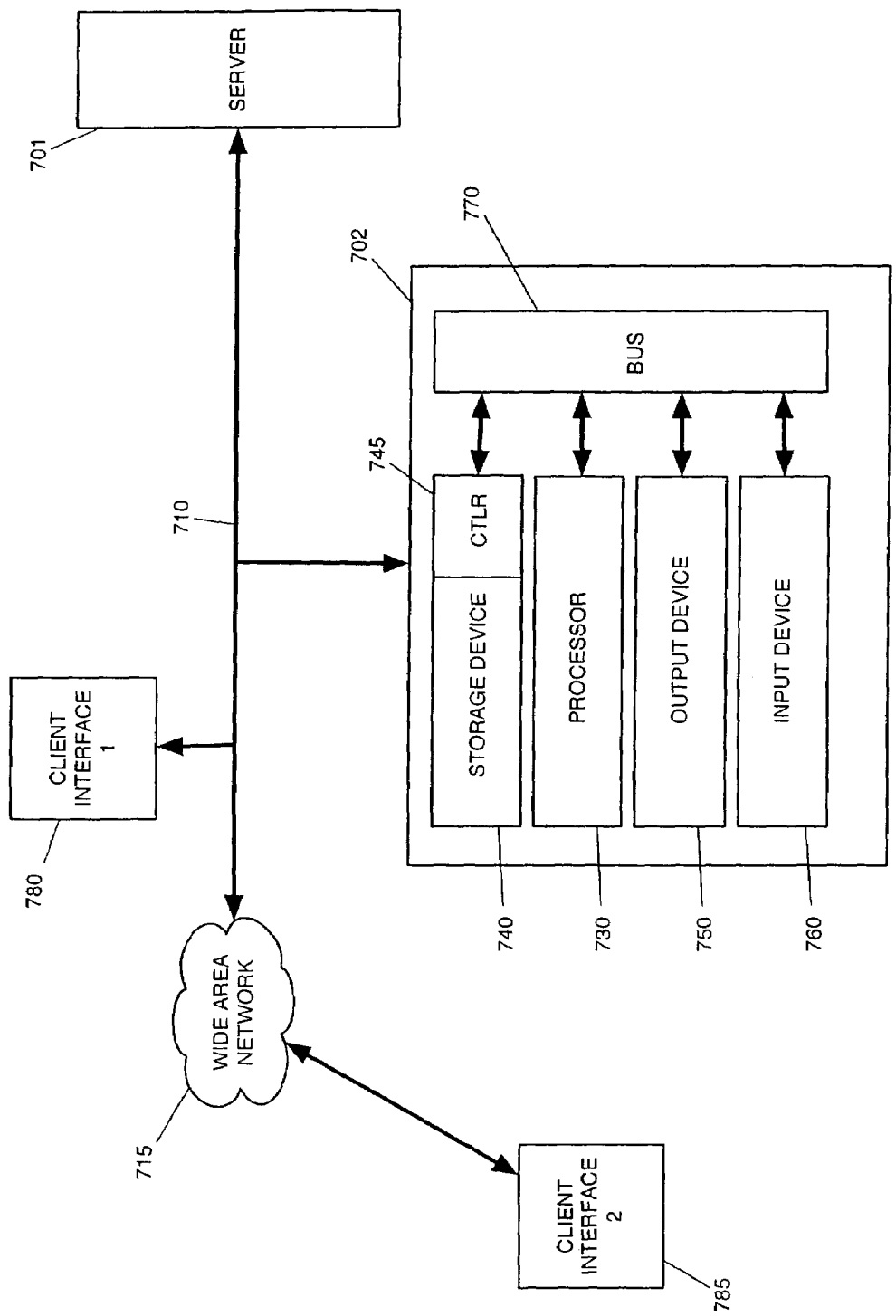
FIG. 7 is a block diagram illustrating generally, among other things, one example of portions of a data analysis system, and an environment with which it is used, for processing and analyzing the data acquired from the manufacturing process.

FIG. 7 depicts a block diagram of a system for implementing an embodiment of the invention analogous to the data processor 140 shown in FIG. 1. Illustrated are a server 701 connected to a computer 702 via a network 710. Although one server 701, one computer 702, and one network 710 are shown, in other embodiments any number or combination of them may be present. Although the server 701 and the network 710 are shown, in another embodiment they may not be present.

The computer 702 may include a processor 730, a storage device 740, an input device 760, and an output device 750, all connected via a bus 770.

The processor 730 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 730 may execute instructions and may include that portion of the computer 702 that controls the operation of the entire computer. Although not depicted in FIG. 7, the processor 730 typically includes a control unit that organizes data and program storage in memory and transfers data and other information between the various parts of the computer 702. The processor 730 may receive data from the input device 760, may read and store code and data in the storage device 740, may send data to the output device 750, and may send and receive code and/or data to/from the network 710.

Although the computer 702 is shown to contain only a single processor 730 and a single bus 770, the present invention applies equally to computers that may have multiple processors and to computers that may have multiple buses with some or all performing different functions in different ways.

The storage device 740 represents one or more mechanisms for storing data. For example, the storage device 740 may include read only memory (ROM), random access memory (RAM), magnetic disk storage media, optical storage media, flash memory devices, and/or other machine-readable media. In other embodiments, any appropriate type of storage device may be used. Although only one storage device 740 is shown, multiple storage devices and multiple types of storage devices may be present. Further, although the computer 702 is drawn to contain the storage device 740, it may be distributed across other computers, for example on server 701.

The storage device 740 includes a controller 745, which in an embodiment may include instructions capable of being executed on the processor 730 to carry out the functions of the present invention. In another embodiment, some or all of the functions of the present invention may be carried out via hardware in lieu of a processor-based system. Although the controller 745 is shown to be contained within the storage device 740 in the computer 702, some or all of the controller 745 may be distributed across other systems, for example on the server 701 and accessed via the network 710.

The input device 750 may be a keyboard, pointing device, mouse, trackball, touchpad, touchscreen, keypad, microphone, voice recognition device, or any other appropriate mechanism for the user to input data to the computer 702. Although only one input device 760 is shown, in another embodiment any number and type of input devices may be present.

The output device 750 is that part of the computer 702 that communicates output to the user. The output device 750 may be a cathode-ray tube (CRT) based video display well known in the art of computer hardware. But, in other embodiments the output device 750 may be replaced with a liquid crystal display (LCD) based or gas, plasma-based, flat-panel display. In another embodiment, the output device 750 may be a speaker. In still other embodiments, any appropriate output device suitable for presenting data may be used. Although only one output device 750 is shown, in other embodiments, any number of output devices of different types or of the same type may be present.

The bus 770 may represent one or more busses, e.g., PCI, ISA (Industry Standard Architecture), X-Bus, EISA (Extended Industry Standard Architecture), or any other appropriate bus and/or bridge (also called a bus controller).

The computer 702 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, appliances with a computing unit, pocket computers, and mainframe computers are examples of other possible configurations of the computer 702. The hardware and software depicted in FIG. 7 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 710 may be any suitable network and may support any appropriate protocol suitable for communication between the server 701 and the computer 702. In an embodiment, the network 710 may support wireless communications. In another embodiment, the network 710 may support hard-wired communications, such as a telephone line or cable. In another embodiment, the network 710 may support the Ethernet IEEE (Institute of Electrical and Electronics Engineers) 802.3x specification. In another embodiment, the network 710 may be the Internet and may support IP (Internet Protocol). In another embodiment, the network 710 may be a local area network (LAN) or a wide area network (WAN). In another embodiment, the network 710 may be a hotspot service provider network. In another embodiment, the network 710 may be an intranet. In another embodiment, the network 710 may be a GPRS (General Packet Radio Service) network. In another embodiment, the network 710 may be any appropriate cellular data network or cell-based radio network technology. In another embodiment, the network 710 may be an IEEE 802.11x wireless network. In still another embodiment, the network 710 may be any suitable network or combination of networks. Although one network 710 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications. Such as the information from the operations 110, 120, 130 of FIG. 1 to the data processor 140 of FIG. 1 via the network 710 of FIG. 1, further depicted and described above and in FIG. 7.

Such signal-bearing media, when carrying machine-readable instructions that direct the functions of the present invention, represent embodiments of the present invention.

Figure 8:
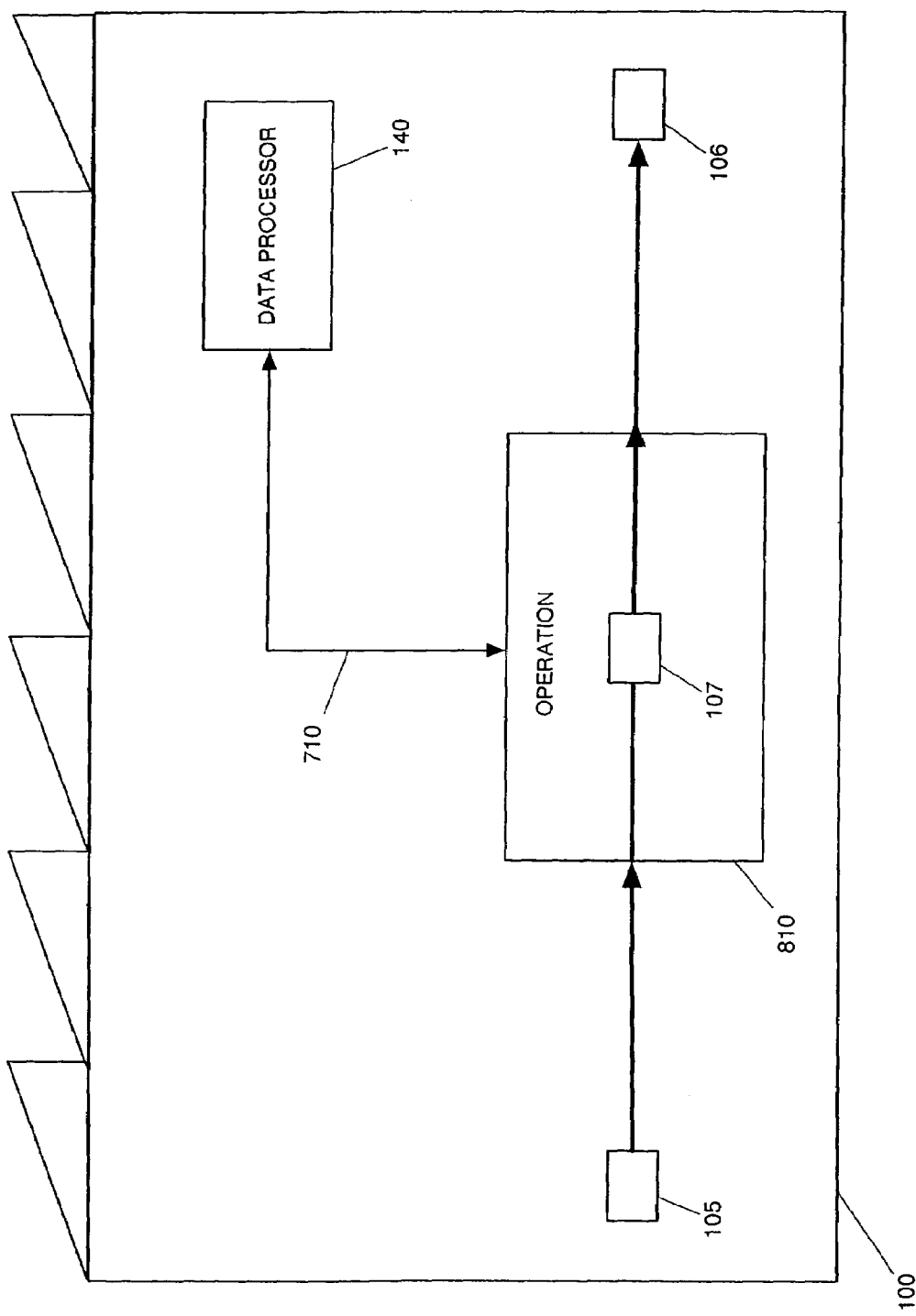
FIG. 8 is a pictorial representation of an exemplary fabrication facility with fabricating processes contained therein.

FIG. 8 depicts a pictorial representation of a simplified manufacturing process for workpieces, according to an embodiment of the present invention. A workpiece for processing 105 is processed by the operation 710 and a resulting end product 106 is produced. Data is measured on the operation 710 that is applicable to the workpiece being processed 107. This data is transmitted over a network to a data processor for storage, analysis and examination. According to an embodiment of the present invention, the operation 710 can be the specific route that the workpiece 107 took through the entire manufacturing facility 100. This has the benefit of only storing measured data that is applicable to the route that a workpiece took in a data set for that workpiece. It is to be recognized that a manufacturing facility represents hundreds of processes, fabrication machines, operations, manufacturing chambers and the like. Storing data from these various data sources and performing non-specific and non-focused data analysis meant to yield some information in regards to a particular lot of workpieces is an extremely large computational cost. This cost is manifested in large delays of time between measurement of the data and response to the conditions that are being measured. In extreme conditions this may result in substandard product 106 leaving the manufacturing facility 100. In an embodiment, it could also result in workpieces proceeding too far along the manufacturing line from where the workpieces encountered out of specification conditions. This could mean that the workpieces have proceeded past a point that can not be recovered from, resulting in wholesale scrapping of workpieces. An analysis on a focused, specific data set corresponding to a particular lot of workpieces can reduce the likelihood of such a result, as operators can react quickly to out of specification conditions. In an embodiment, a system non-manually reacts to out of specification conditions.

There are distinct advantages for this combination and aggregation as described herein. It allows for quicker more focused data analysis of conditions that directly affect the quality of the produced workpieces. It reduces the amount of extraneous data in a data set that do not directly relate to a particular production lot of workpieces or group. Quicker analysis also provides for quicker reaction, allowing operators and engineers to quickly respond to conditions, address the problems, and reduce the amount of product being affected by those conditions.

What is claimed is:

1. A method comprising:
   detecting conditions in an electronic device fabrication facility including:
   determining a route a workpiece included in a lot follows during fabrication, wherein the route includes at least one operation including a plurality of subdivisions, each of the plurality of subdivisions operable to perform a substantially similar operation to the workpiece and wherein the route includes no more than one of the plurality of subdivisions;
   measuring production data related to at least one manufacturing process performed during fabrication of the lot produced in the electronic device fabrication facility, wherein the production data includes at least one measurement taken directly on the workpiece included in the lot, and at least one measurement of conditions of the manufacturing process performed during fabrication of the lot that is not taken directly on the workpiece;
   measuring facility data during the fabrication of the lot, the facility data related to the entire electronic device fabrication facility and taken from sources not directly related to the at least one manufacturing process;
   storing measured data relevant to the route the workpiece followed during fabrication including the measured production data and the measured facility data taken during the fabrication of the lot in a data set of the workpiece,
   analyzing the data set of the workpiece;
   determining current conditions using the analysis; and
   applying a process control to the route based on the analysis.

2. The method of claim 1, wherein the route that the workpiece follows is a subset of the entire manufacturing process.

3. The method of claim 1, wherein determining the route the workpiece follows during fabrication includes;
   identifying operations that are linked in some manner;
   determining subdivisions of the identified operations; and
   developing a listing of all possible routes through the subdivisions of the operations that workpieces may traverse during fabrication.

4. The method of claim 3, wherein operations includes machines, chambers, processes associated with the route the workpiece follows.

5. The method of claim 3, wherein the manner of linking is by physical location.

6. The method of claim 3, wherein the manner of linking is by machine type.

7. The method of claim 3, wherein the manner of linking is by time of processing.

8. The method of claim 3, wherein the linking is by any other condition relevant to the fabrication process.

9. The method of claim 3, wherein the determining the subdivisions includes identifying all parts of the operation, machine, process, and chamber that have a substantially similar end product.

10. The method of claim 3, wherein all possible routes only includes probable routes through the subdivisions.

11. The method of claim 1, wherein applying a process control to the route based on the analysis includes continuing a particular manufacturing process based on the analysis.

12. The method of claim 1, applying a process control to the route based on the analysis includes stopping a particular manufacturing process based on the analysis.

13. A method comprising:
   detecting conditions in an electronic device fabrication facility including:
   determining a particular route a workpiece included in a lot followed during fabrication, wherein the particular route is one of a plurality of routes, wherein the particular route and each of the plurality of routes include at least one operation including a plurality of subdivisions, each of the plurality of subdivisions operable to perform a substantially similar operation to the workpiece and wherein the particular route includes no more than one of the plurality of subdivisions;
   separately for each of the plurality of routes, measuring fabrication data items relevant to each of the plurality of routes including measuring production data relate to at least one manufacturing process performed during fabrication of the lot produced in the electronic device fabrication facility, wherein the production data includes at least one measurement taken directly on the workpiece included in that lot, and at least one measurement of conditions of the manufacturing process performed during fabrication of the lot that is not taken directly on the workpiece;
   measuring facility data during the fabrication of the lot, the facility data related to the entire electronic device fabrication facility and taken from sources not directly related to the at least one manufacturing process;
   storing measured data relevant to each of the plurality of routes, including storing the measured production data relevant to the particular route the workpiece followed during fabrication and the measured facility data taken during fabrication of the lot in a data set of the workpiece;
   analyzing the data set of the workpiece;
   determining current conditions using the analysis; and
   applying a process control to the particular route based on the analysis.

14. The method of claim 13, wherein the fabrication data items are measured from production data sources.

15. The method of claim 14, wherein the production data source is a test probe.

16. The method of claim 14, wherein the production data source is a parametric measuring device.

17. The method of claim 14, wherein the production data source is one in which film thickness is being measured.

18. The method of claim 14, wherein the production data source is one in which critical dimensions are being measured.

19. The method of claim 14, wherein the production data source includes any other data source that is relevant to the fabrication process and its condition.

20. A method comprising:
   detecting conditions in an electronic device fabrication facility, including:

determining an exact route a wafer included in a lot actually followed during fabrication, wherein the exact route is one of a plurality of routes, wherein the exact route and each of the plurality of routes include at least one operation including a plurality of subdivisions, each of the plurality of subdivisions operable to perform a substantially similar operation to the wafer and wherein the exact route includes no more than one of the plurality of subdivisions;

separately for each of the plurality of routes, measuring fabrication data relevant to each of the plurality of routes including measuring production data related to at least one manufacturing process performed during fabrication of the lot produced in the electronic device fabrication facility, wherein the production data includes at least one measurement taken directly on the wafer included in that lot, and at least one measurement of conditions of the manufacturing process performed during fabrication of the lot that is not taken directly on the wafer;

measuring facility data during the fabrication of the lot, the facility data from sources not directly related to the at least one manufacturing process and related to the entire electronic device fabrication facility;

storing measured data relevant to each of the plurality of routes, including storing the measured production data relevant to the exact route the wafer actually followed during fabrication and the measured facility data during fabrication of the lot in a data set of the wafer in a data processing device;

analyzing the data set of the wafer;

examining the analysis to determine current conditions; and applying a process control to the exact route based on the analysis.

21. The method of claim 20, wherein measured data relevant to the route the wafer actually followed during fabrication is relevant based on physical proximity to the route.

22. The method of claim 20, wherein measured data relevant to the route the wafer actually followed during fabrication is relevant based on manufacturing result.

23. The method of claim 20, wherein the data processing device is a computer system containing a relational database on a storage device and executed on a processor.

24. The method of claim 20, wherein storing measured data in a data processing device includes:

adding a data item from the measured route fabrication data to the data set of the wafer; and relating the added data item to the previously stored data items by some point of data commonality.

25. The method of claim 24, wherein the point of data commonality is based on time.

26. A method comprising:

detecting conditions in an electronic device fabrication facility, including:

determining an exact route a workpiece included in a lot actually followed during fabrication, wherein the exact route is one of a plurality of routes, wherein the exact route and each of the plurality of routes include at least one operation including a plurality of subdivisions, each of the plurality of subdivisions operable to perform a substantially similar operation to the wafer and wherein the exact route includes no more than one of the plurality of subdivisions;

separately for each of the plurality of routes, measuring fabrication data relevant to each of the plurality of routes including measuring production data related to at least one manufacturing process performed during fabrication of the lot produced in the electronic device fabrication facility, wherein the production data includes at least one measurement taken directly on the workpiece included in that lot, and at least one measurement of conditions of the manufacturing process performed during fabrication of the lot that is not taken directly on the workpiece;

measuring facility data during the fabrication of the lot, the facility data from sources not directly related to the at least one manufacturing process and related to the entire electronic device fabrication facility;

storing measured data relevant to each of the plurality of routes, including storing the measured production data relevant to the particular route the workpiece actually followed during fabrication and the measured facility data during fabrication of the lot in a data set of the workpiece in a data processing device;

analyzing the data set of the workpiece;

determining current conditions using the analysis; and applying a process control to the exact route based on the analysis.

27. The method of claim 26, wherein the analysis is a statistical analysis.

28. The method of claim 26, wherein the analysis is a trend analysis.

29. The method of claim 26, wherein the analysis is a correlation study.

30. The method of claim 26, wherein examining includes comparing the analysis of the data set of the workpiece to expected conditions.

31. A method comprising:

responding to conditions in an electronic device fabrication facility, including:

determining a route a workpiece included in a lot followed during fabrication, wherein the route includes at least one operation including a plurality of subdivisions, each of the plurality of subdivisions operable to perform a substantially similar operation to the workpiece and wherein the route includes no more than one of the plurality of subdivisions;

measuring production data related to at least one manufacturing process performed during fabrication of the lot produced in the electronic device fabrication facility, wherein the production data includes at least one measurement taken directly on the workpiece included in the lot, and at least one measurement of conditions of the manufacturing process performed during fabrication of the lot that is not taken directly on the workpiece;

measuring facility data during the fabrication of the lot, the facility data related to the entire electronic device fabrication facility and taken from sources not directly related to the at least one manufacturing process;

storing measured data relevant to the route the workpiece followed during fabrication including the measured production data and the measured facility data taken during the fabrication of the lot in a data set of the workpiece, analyzing the data set of the workpiece;

determining current conditions using the analysis;

comparing the current conditions to expected conditions; and responding to the comparison, wherein responding includes triggering a warning when the current conditions depart from the expected conditions.

32. The method of claim 31, wherein the route the workpiece followed is a subset of the entire manufacturing process.

33. The method of claim 31, wherein determining the route a workpiece followed during fabrication includes:
identifying operations that are linked in some manner;
determining subdivisions of the identified operations; and
developing a listing of all possible routes through the subdivisions of the operations that workpieces may traverse during fabrication.

34. The method of claim 33, wherein operations includes machines, chambers, processes associated with the route the workpiece followed.

35. The method of claim 33, wherein the manner of linking is by physical location.

36. The method of claim 33, wherein the manner of linking is by machine type.

37. The method of claim 33, wherein the manner of linking is by time of processing.

38. The method of claim 33, wherein the linking is by any other condition relevant to the fabrication process.

39. The method of claim 33, wherein the determining the subdivisions includes identifying all parts of the operation, machine, process, and chamber that have a substantially similar end product.

40. The method of claim 33, wherein all possible routes only includes probable routes through the subdivisions.

41. The method of claim 31, wherein responding to the comparison when the current conditions depart from the expected conditions includes sending a message over a network.

42. The method of claim 31, wherein responding to the comparison when the current conditions depart from the expected conditions includes a non-manual shutting down of one or more fabrication machines in a group related to the particular route.

43. A method comprising:
responding to conditions in an electronic device fabrication facility, including:
determining each route one or more workpieces included in a lot follows during fabrication, wherein each route includes at least one operation including a plurality of subdivisions, each of the plurality of subdivisions operable to perform a substantially similar operation to the one or more workpieces and wherein each route includes no more than one of the plurality of subdivisions;
separately for each route, measuring fabrication data items relevant to each route including measuring production data related to at least one manufacturing process performed during fabrication of the lot produced in the electronic device fabrication facility;
determining an exact route a particular workpiece followed during fabrication;
measuring production data related to the particular workpiece, wherein the production data includes at least one measurement taken directly on the workpiece included in the lot, and at least one measurement of conditions of the manufacturing process performed during fabrication of the lot that is not taken directly on the workpiece;
measuring facility data during the fabrication of the lot, the facility data related to the entire electronic device fabrication facility and taken from sources not directly related to the at least one manufacturing process;
storing measured data items relevant to the exact route the particular workpiece followed during fabrication including the measured production data for the particular workpiece and the measured facility data during fabrication of the lot in a data set of the workpiece;
analyzing the data set of the particular workpiece;
determining current conditions using the analysis;
comparing the current conditions to expected conditions; and
responding to the comparison, wherein responding includes triggering a warning when the current conditions depart from the expected conditions.

44. The method of claim 43, wherein the fabrication data items are measured from production data sources.

45. The method of claim 44, wherein the production data source is a test probe.

46. The method of claim 44, wherein the production data source is a parametric measuring device.

47. The method of claim 44, wherein the production data source is one in which film thickness is being measured.

48. The method of claim 44, wherein the production data source is one in which critical dimensions are being measured.

49. A method comprising:
responding to conditions in an electronic device fabrication facility, including:
determining each route one or more workpieces follows during fabrication, wherein each route includes at least one operation including a plurality of subdivisions, each of the plurality of subdivisions operable to perform a substantially similar operation to the one or more workpiece and wherein each route includes no more than one of the plurality of subdivisions;
separately for each route, measuring fabrication data items relevant to each route including measuring production data related to at least one manufacturing process performed during fabrication of the lot produced in the electronic device fabrication facility,
determining an exact route a particular workpiece followed during fabrication;
measuring production data related to the particular workpiece, wherein the production data includes at least one measurement taken directly on the workpiece included in the lot, and at least one measurement of conditions of the manufacturing process performed during fabrication of the lot that is not taken directly on the workpiece;
measuring facility data during the fabrication of the lot, the facility data related to the entire electronic device fabrication facility and taken from sources not directly related to the at least one manufacturing process;
storing measured data items relevant to the exact route the particular workpiece followed during fabrication including the measured production data for the particular workpiece and the measured facility data during fabrication of the lot in a data set of the workpiece;
analyzing the data set of the particular workpiece;
determining current conditions using the analysis;
comparing the current conditions to expected conditions; and
responding to the comparison, wherein responding includes triggering a warning when the current conditions depart from the expected conditions.

50. The method of claim 49, wherein measured data items relevant to the route the particular workpiece actually followed during fabrication is relevant based on physical proximity to the route.

51. The method of claim 49, wherein measured data items relevant to the route the particular workpiece actually followed during fabrication is relevant based on manufacturing result.

52. The method of claim 49, wherein the data processing device is a computer system containing a relational database on a storage device and executed on a processor.

53. The method of claim 49, wherein storing measured-data items in a data processing device includes:
- adding a data item from the measured route fabrication data items relevant to that route to the data set of the particular workpiece; and
- relating the added data item to the previously stored data items by some point of data commonality.

54. The method of claim 53, wherein point of data commonality is based on time.

55. A method comprising:
- responding to conditions in an electronic device fabrication facility, including:
- determining each route one or more workpieces follows during fabrication, wherein each route includes at least one operation including a plurality of subdivisions, each of the plurality of subdivisions operable to perform a substantially similar operation to the one or more workpieces and wherein each route includes no more than one of the plurality of subdivisions;
- separately for each route, measuring fabrication data items relevant to each route including measuring production data related to at least one manufacturing process performed during fabrication of the lot produced in the electronic device fabrication facility,
- determining an exact route a particular workpiece followed during fabrication;
- measuring production data related to the particular workpiece, wherein the production data includes at least one measurement taken directly on the workpiece included in the lot, and at least one measurement of conditions of the manufacturing process performed during fabrication of the lot that is not taken directly on the workpiece;
- measuring facility data during the fabrication of the lot, the facility data related to the entire electronic device fabrication facility and taken from sources not directly related to the at least one manufacturing process;
- storing measured data items relevant to the exact route the particular workpiece followed during fabrication including the measured production data for the particular workpiece and the measured facility data during fabrication of the lot in a data set of the workpiece;
- performing an analysis on the data set of the particular workpiece on a data processing device;
- determining current conditions using the analysis;
- non-manually comparing the current conditions to expected conditions; and
- responding to the comparison, wherein responding includes triggering a warning when the current conditions depart from the expected conditions.

56. The method of claim 55, wherein the analysis is a statistical analysis.

57. The method of claim 55, wherein the analysis is a trend analysis.

58. The method of claim 55, wherein the analysis is a correlation study.

59. The method of claim 55, wherein responding includes:
- alerting a user when the comparison shows an unexpected condition.

60. The method of claim 59, wherein the alerting is by visual cues on an output device of the data processor.

61. The method of claim 59, wherein the alerting is by the data processor sending a message to the user of an unexpected condition.

62. The method of claim 59, wherein the data processing device non-manually halts production when an unexpected condition occurs.

63. The method of claim 55, wherein responding includes:
- not alerting a user when the comparison shows expected conditions in the fabrication facility.

64. The method of claim 55, wherein responding includes:
- non-manually continuing fabrication when the comparison shows expected conditions in the fabrication facility.

* * * * *

UNITED STATES PATENT AND TRADEMARK OFFICE
CERTIFICATE OF CORRECTION

PATENT NO. : 7,395,130 B2 Page 1 of 1
APPLICATION NO. : 10/789895
DATED : July 1, 2008
INVENTOR(S) : Toyoshima et al.

It is certified that error appears in the above-identified patent and that said Letters Patent is hereby corrected as shown below:

In column 14, line 27, in Claim 13, delete "relate" and insert -- related --, therefor.

Signed and Sealed this

Ninth Day of September, 2008

JON W. DUDAS
*Director of the United States Patent and Trademark Office*